No. 624,739. Patented May 9, 1899.
W. L. BEALL.
RATCHET LEVER AND SEGMENT FOR PLOWS.
(Application filed Feb. 1, 1899.)
(No Model.) 2 Sheets—Sheet 1.
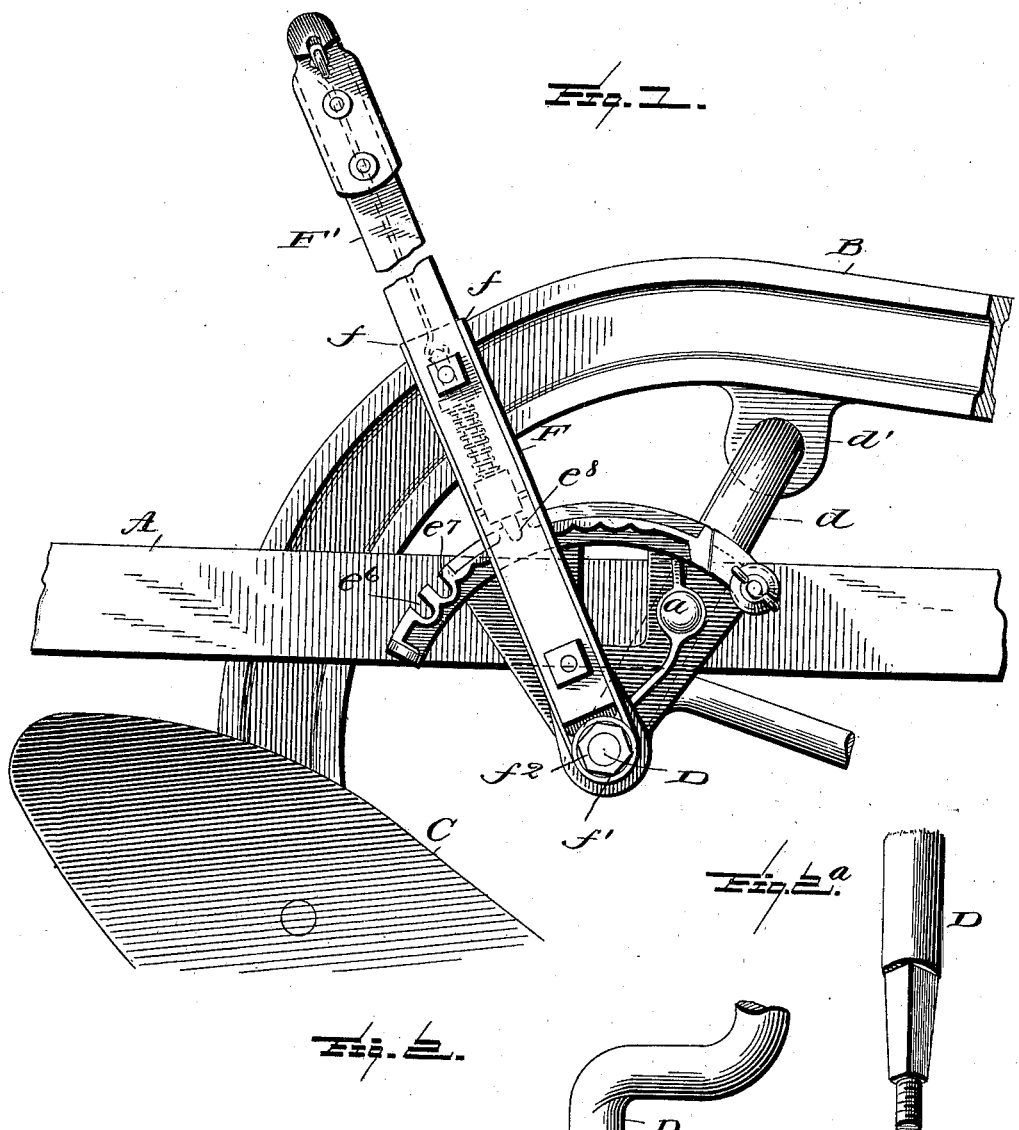
Witnesses
L. C. Hills
J. D. Kingsbury
Inventor
William L. Beall
By Whitaker Prevost
Attorneys No. 624,739. Patented May 9, 1899.
W. L. BEALL.
RATCHET LEVER AND SEGMENT FOR PLOWS.
(Application filed Feb. 1, 1899.)
(No Model.) 2 Sheets—Sheet 2.
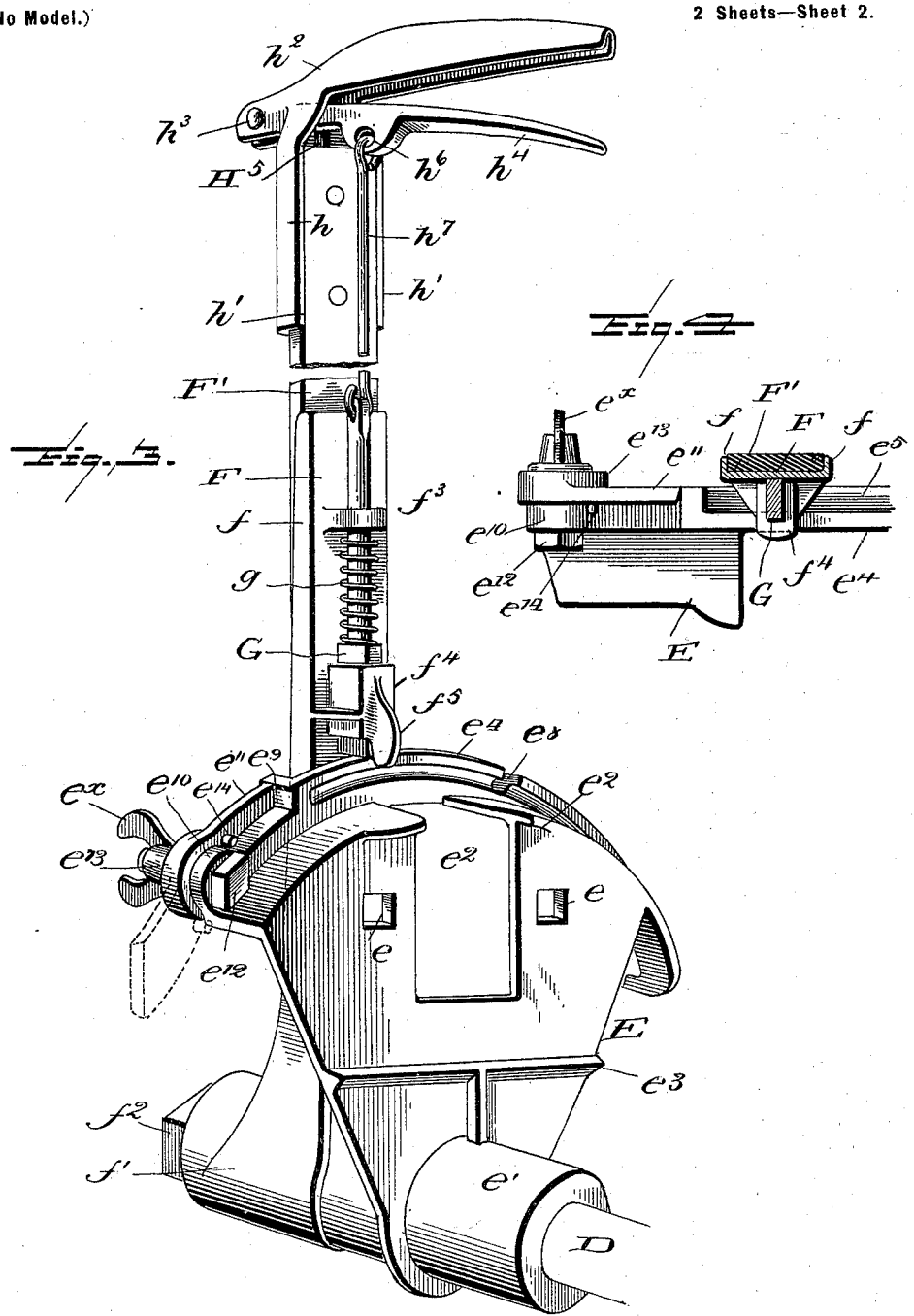
Witnesses
L. C. Hills.
J. D. Kingsbury.
Inventor
William L. Beall
By Whitaker & Prevost
Attorneys
THE NORRIS PETERS CO., PHOTO-LITHO., WASHINGTON, D. C.

UNITED STATES PATENT OFFICE.

WILLIAM L. BEALL, OF ALBION, MICHIGAN, ASSIGNOR TO THE GALE MANUFACTURING COMPANY, OF SAME PLACE.

RATCHET LEVER AND SEGMENT FOR PLOWS.

SPECIFICATION forming part of Letters Patent No. 624,739, dated May 9, 1899.

Application filed February 1, 1899. Serial No. 704,072. (No model.)

*To all whom it may concern:*

Be it known that I, WILLIAM L. BEALL, a citizen of the United States, residing at Albion, in the county of Calhoun and State of Michigan, have invented certain new and useful Improvements in Ratchet Levers and Segments for Plows, &c.; and I do hereby declare the following to be a full, clear, and exact description of the invention, such as will enable others skilled in the art to which it appertains to make and use the same.

My invention consists in the novel features hereinafter fully described, reference being had to the accompanying drawings, which illustrate one form in which I have contemplated embodying my invention, and said invention is fully disclosed in the following description and claims.

Referring to the said drawings, Figure 1 is a side view of a portion of a wheel-plow, showing my invention applied thereto. Fig. 2 is a top plan view of the segment shown in Fig. 1, the lever being shown in section. Fig. $2^a$ is a detail of one end of the crank-shaft. Fig. 3 is an enlarged perspective view of the segment lever and ratchet shown in Fig. 1. Fig. 4 is an enlarged top view of a portion of the segment, the lever being shown in section.

In so-called "sulky" or "wheel" plows it is customary to provide a frame which is carried by the ground-wheels, to mount the plow in said frame, and to provide a lever-ratchet and ratchet-segment by means of which the plow can be raised or lowered with respect to the frame and by means of which it can be locked in its raised position, and also when it is in the ground to keep it from running out. The locking of the plow to hold it down in the ground is desirable with certain kinds of soil; but under different conditions, where there are many large rocks or other obstructions, it is very undesirable to lock the plow in the ground, as in such case when it encounters an obstruction it cannot rise over it, and either the machine is stopped or some part of it is liable to break.

The object of this invention is to provide a sulky-plow with a ratchet lever and segment by which the plow can be locked in its lowest position, when desired, and also left free in the soil, when desired, according to the kind of soil in which it is used.

In the drawings, A represents a portion of the frame of a sulky-plow.

B represents the plow-beam, and C the plow proper.

D represents a crank-shaft mounted in bearings in the frame and provided with a crank $d$, connected by a bearing-block $d'$ to the plow-beam, this crank serving to raise and lower the plow-beam and plow.

E represents a ratchet-segment secured to the frame-bar A by bolts $a\,a$, passing through holes $e\,e$, provided at its lower end with a bearing $e'$, which receives and supports one end of the crank-shaft D. The inner face of the segment E is also provided with ribs or webs $e^2\,e^2\,e^3$, which engage the upper and lower edges of frame-bar A and assist in holding the segment securely thereto. The curved or peripheral portion of the segment is provided with a narrow rib $e^4$, upon which the ratchet slides, and below this rib on the outer side of the segment is a curved shoulder $e^5$, having its upper surface parallel with the top surface of the rib $e^4$. The segment is provided adjacent to the rear end of its curved portion with a series of locking recesses or notches $e^6\,e^7\,e^8$, said recesses being the full width of the rib $e^4$ and shoulder $e^5$, the rib having laterally-extending portions adjacent to the said recesses to give greater strength. At the forward end of the curved portion of the segment is a single locking-recess $e^9$, forward of which is secured a pivoted arm, which is adapted, when turned into operative position, to fill up the locking-recess and prevent the ratchet from entering the same. In this instance the segment is provided with a perforation $e^{10}$, to which the arm $e^{11}$ is pivoted by a bolt $e^{12}$, which extends through said ear and arm and is provided with a wing-nut $e^x$, by means of which the arm $e^{11}$ can be clamped rigidly in position to hold the ratchet out of the locking-recess, as shown in full lines in the drawings, or in its forward position leaving the locking-recess free, as indicated in dotted lines, Fig. 3. The arm $e^{11}$ is preferably provided on its outer side with a circular hub portion $e^{13}$, which forms a stop to limit the forward movement of the ratchet-lever, and with a pin $e^{14}$, which engages the shoulder $e^5$ and holds the arm in position with its upper face in line with the upper face of the rib $e^4$, so that the ratchet will pass over it in either direction without catching.

F represents the shank of the ratchet-lever, which is preferably provided on its outer face with lateral webs or flanges $ff$, (see Figs. 1, 2, and 4,) and is provided at its lower end with a collar $f'$, formed integrally therewith and provided with a squared aperture to engage a squared portion of the crank-shaft D. The collar $f'$ is held on the crank-shaft by a nut $f^2$. The shank F extends above the segment and is provided on its inner face with guides $f^3$ $f^4$ for a ratchet G, which is longitudinally movable in said guides and provided with a spring $g$, interposed between the upper guide $f^3$ and a shoulder on the lower end of the ratchet. The ratchet has its lower end which engages the segment of about the width of the rib $e^4$ and shoulder $e^5$, so that between the notches in the segment it will ride on the top of the rib $e^4$, and when moved forward to its greatest extent it will ride over the arm $e^{11}$, when the latter is in the position shown in full lines in the figures.

F' represents the lever-arm, which is bolted to the shank F and lies between the lateral ribs or webs $ff$. (See Figs. 1, 2, and 4.) At its upper end the lever-arm F' is provided with a handle and ratchet-lifter of peculiar construction. H represents the handle, which is provided with a vertical portion $h$, bolted to the lever-arm F' and having lateral flanges $h'$ $h'$ for engaging the sides of the lever-arm, and a horizontal hand portion $h^2$ convex on its upper side and concave on its lower side, said portion $h^2$ extending a considerable distance on one side of the part $h$ and a short distance on the other side, where it is provided with horizontal apertures to receive a pin or rivet $h^3$. A horizontal ratchet-lifter $h^4$ extends along under the handle portion $h^2$ and through an aperture $h^5$ in the vertical portion $h$ and has one end pivoted on the pin or rivet $h^3$. The ratchet-lifter has a perforation or eye $h^6$, which receives one end of a link $h^7$, connecting the ratchet-lifter $h^4$ with the pawl or ratchet G. (See Fig. 3.) The operator in placing his hand over the horizontal portion $h^2$ of the handle will find his fingers in the correct position to easily raise the ratchet out of the locking-recesses in the segment.

The lower guide $f^4$ on the shank F is provided with a lip $f^5$, which rides along the inner face of the rib $e^4$ and serves as a guide to hold the ratchet lever and segment against lateral movement, although this lip is not essential.

From the foregoing description it will be seen that when the operator desires to lock the plow to hold it against rising in the soil the arm $e^{11}$ will be thrown forward into the position shown in Fig. 3 in dotted lines and secured by its thumb-nut, and the ratchet-lever will be pushed forward until it strikes the hub of said arm, when the ratchet G will drop into the locking-recess $e^9$. When it is desired to have the plow free to rise out of the soil, the arm $e^{11}$ will be turned backward and secured by its thumb-nut in the position shown in full lines in the drawings, when said arm will hold up the ratchet G and prevent it from entering the recess $e^9$, so that the plow will not be locked in the soil.

What I claim, and desire to secure by Letters Patent, is—

1. In a lever locking mechanism, the combination with a segment provided with a vertically-disposed rib cut away at intervals to form notches, of a lever, a pawl or ratchet carried by said lever adapted to slide on said rib and to engage said notches, and an arm pivoted to said segment and adapted to close one of said notches, said arm having its upper face in line with and forming substantially a continuation of said rib when in operation, substantially as described.

2. In a lever locking mechanism, the combination with a segment provided with a vertically-disposed rib cut away at intervals to form notches, of a lever, a pawl or ratchet carried by said lever adapted to slide on said rib and to engage said notches, and an arm pivoted to said segment and adapted to close one of said notches, said arm having its upper face in line with and forming substantially a continuation of said rib, and means for securing said arm rigidly with respect to said segment, substantially as described.

3. In a lever locking mechanism, the combination with a segment provided with a vertical rib, cut away at intervals to form notches, of a lever, a pawl carried by said lever adapted to slide on said rib and to engage said notches, an arm for closing one of said notches having its upper face in line with and forming substantially a continuation of said rib when in operative position, a bolt pivotally connecting said arm to said segment and a clamping-nut on said bolt for clamping said arm rigidly with respect to said segment, substantially as described.

4. In a lever locking mechanism, the combination with the segment provided with a vertical rib having notches therein and laterally-extending reinforcing portions adjacent to said recesses, said rib being cut away at one end to form the last notch, of an arm pivoted to said segment adjacent to the cut-away portion of said rib, and adapted to fill said cut-away portion, said arm having its upper face in line with and forming substantially a continuation of the said rib when in operative position, a lever, and a pawl or ratchet carried by said lever, said pawl being adapted to slide over said rib and to engage said notches, substantially as described.

5. In a sulky-plow, the combination with the frame, of a crank-shaft carried thereby, a plow operatively connected with said crank-shaft, a lever connected to said shaft, a pawl or ratchet carried by said lever, a segment secured to said frame, provided with a vertical rib having locking-notches therein adjacent to one end and having the other end cut away to form a single locking-notch, an arm pivoted to said segment adjacent to said cut-away portion of the rib, and adapted to fill said cut-away portion, the upper face of said arm being in line with the upper face of said rib and forming substantially a continuation thereof when in operation, and a clamping device for securing said arm rigidly with respect to said segment, substantially as described.

In testimony whereof I affix my signature in the presence of two witnesses.

WILLIAM L. BEALL.

Witnesses:
G. W. BORTLES,
M. L. DEAN.